(12) United States Patent
Goto

(10) Patent No.: US 6,216,047 B1
(45) Date of Patent: Apr. 10, 2001

(54) ADAPTIVE CONTROL METHOD FOR CYCLIC SIGNAL

(75) Inventor: Katsuhiro Goto, Inuyama (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/174,544

(22) Filed: Oct. 19, 1998

(30) Foreign Application Priority Data

Nov. 7, 1997 (JP) .................................................. 9-306141

(51) Int. Cl.[7] .................................................. G05B 13/02
(52) U.S. Cl. ................................. 700/28; 700/35; 700/52
(58) Field of Search ................................. 700/28, 35, 52, 700/53, 32

(56) References Cited

U.S. PATENT DOCUMENTS

| | | | |
|---|---|---|---|
| 5,768,124 | * 6/1998 | Stothers et al. | 700/38 |
| 6,094,601 | * 7/2000 | Popovich | 700/28 |

FOREIGN PATENT DOCUMENTS

| | | |
|---|---|---|
| 8-44377 | 2/1996 | (JP) . |
| 8-272378 | 10/1996 | (JP) . |
| 9-198106 | * 7/1997 | (JP) . |
| 9-319403 | * 12/1997 | (JP) . |

* cited by examiner

Primary Examiner—William Grant
Assistant Examiner—Paul Rodriguez
(74) Attorney, Agent, or Firm—Jacobson, Price, Holman & Stern, PLLC

(57) ABSTRACT

An adaptive control method employs an adaptive signal generation algorithm 11 for generating an adaptive signal $y(n)$ which cancels a cyclic signal $y(n)$ at a measurement point 24, and an adaptive coefficient vector renewing algorithm 12 for renewing the amplitudes $a(n)$ and phases $\phi(n)$ of the adaptive signal $y(n)$. The adaptive coefficient vector renewing algorithm 12 is quasi-normalized by a sum $[A(\omega)+\gamma]$. The $A(\omega)$ is a gain measurement of a transfer characteristic 23, and the $\gamma$ is a divergence prevention constant. Hence, in a frequency region where the gain $A(\omega)$ is high, a step size is small so that the stability of the adaptive control method can be enhanced. In a frequency region where the gain $A(\omega)$ is low, the step size is large so that the adaptability can be improved. As a result, the convergence stability and the characteristic following the frequency variation are compatible with each other.

3 Claims, 14 Drawing Sheets

ADAPTIVE CONTROL METHOD FOR CYCLIC SIGNAL

BACKGROUND OF THE INVENTION

1. Field of the Invention

The present invention belongs to a technical field of active suppression engineering. For instance, it belongs to a technical field of active damping when a cyclic signal is a vibration, and to a field of active noise suppression when a cyclic signal is a noise. Thus, depending on the types of the cyclic signal, its application field can be expanded widely.

2. Description of the Related Art

Japanese Unexamined Patent Publication (KOKAI) No. 8-44,377 is derived from Japanese Patent Application No. 6-201,384, and discloses a DXHS-LMS algorithm. Compared to a previous FX-LMS algorithm, the DXHS-LMS algorithm produces an advantage in that, although the calculation steps are reduced, the convergence speed can be improved. The FX-LMS algorithm is referred to in the publication and Japanese Unexamined Patent Publication (KOKAI) No. 8-272,378.

However, even the DXHS algorithm cannot necessarily exhibit an appropriate following characteristic when a transfer function of a controlled system is a resonance system whose gain shows a sharp peak. For example, when angular frequencies $\omega_k$ to be suppressed varies rapidly in a cyclic signal f(n), the adaptation, effected by the adaptive control system according to the DXHS algorithm, cannot fully follow the rapid variation. As a result, an error signal e (n) may sometimes enlarge to a non-negligible extent.

There is a data tabulation method, one of the countermeasures for coping with the rapid variation of the specific components of the angular frequencies $\omega_k$ to be suppressed in the cyclic signal f(n). In the data tabulation method, the amplitudes and phases of the adaptive signal y(n) are converted into a tabulated data for each range of the angular frequencies $\omega_k$, and the amplitudes and phases of the adaptive signal y(n) are read out from the tabulated data to renew the components of the adaptive coefficient vector W(n) when the angular frequencies $\omega_k$ have shifted. Thus, the convergence speed can be improved.

Whilst, in the method employing the tabulated data, the amplitudes and phases of the adaptive signal y(n) vary discontinuously upon reading out the data from the tabulated data in accordance with the variation of the angular frequency $\omega_k$. Accordingly, there arises inconvenience in that the user feels uneasiness. In addition, the method requires a memory capacity for storing the tabulated data. Consequently, there also arises other inconvenience in terms of the memory capacity. Thus, although the method employing the tabulated data can compensate for the lack of the following characteristic in the DXHS algorithm, it results in the new inconveniences. Therefore, the method cannot be smart and reasonable measures for solving the problem associated with the DXHS algorithm.

Hence, the inventor of the present invention returned to the square one. He then studied into the cause of the delayed adaptation which results in the lack of the convergence speed in the DXHS algorithm when the controlled system is the resonance system. As a result, he thought of the following facts: the maximum value of the renewing coefficient (or step size parameter) is designed so that it is stable in the high-gain frequency where it is highly probable to diverge; and accordingly the renewing coefficient is extremely small in the other frequency regions. In other words, the renewing coefficient is designed so that the adaptive control system does not diverge even in the high-gain frequency range. Hence, the renewing coefficient cannot be set at such a sufficiently large value that the convergence speed is sufficiently fast in the other frequency regions.

SUMMARY OF THE INVENTION

It is an object of the present invention to provide a novel adaptive control method for a cyclic signal. In the novel adaptive control method, the stability of adaptive convergence and the characteristic following a specific angular frequency to be suppressed are compatible with each other even when an adaptive signal y(n) is added at a measurement point by way of a transfer function having a resonance frequency.

The inventor of the present invention invented the following measures in order to carry out the object.

A first aspect of the present invention is an adaptive control method for a cyclic signal, and comprises:

adding an adaptive signal y(n) to a cyclic signal f(n) in an inverted phase at a measurement point by way of a transfer system having a predetermined transfer characteristic, thereby actively eliminating an influence of specific components of the cyclic signal f(n) to the measurement point, and suppressing an error signal e(n) detected at the measurement point to which the cyclic signal f(n) is input;

the cyclic signal f(n) including at least one angular frequency $\omega_k^*$ ($1 \leq k \leq K'$, k and K' are natural numbers.);

the adaptive signal y(n) being a linear combination of at least one sinusoidal signal whose angular frequencies $\omega_k$ ($1 \leq k \leq K \leq K'$, K is also a natural number.) are K pieces of measurements or estimations of the angular frequencies $\omega_k^*$;

wherein the adaptive control method employing:

an adaptive signal generation algorithm for generating the adaptive signal y(n) at each time n in a discrete time; and an adaptive coefficient vector renewing algorithm for carrying out a quasi-normalized gradient method;

the quasi-normalized gradient method comprising the step of:

subtracting a vector from an adaptive coefficient vector W(n), thereby renewing the adaptive coefficient vector W(n);

the adaptive coefficient vector W(n) including components defining at least amplitudes and phases of the sinusoidal components of the adaptive signal y(n);

the vector being prepared by multiplying components of a gradient vector $\nabla(n) = \partial e^2(n)/\partial W(n)$ with appropriate step size parameters, and by dividing the resulting products with a sum $(A_k + \gamma_k)$;

$A_k$ being gain measurements or gain estimations of the transfer characteristic corresponding to the angular frequencies $\omega_k$;

$\gamma_k$ ($0 \leq \gamma_k$) being appropriate divergence prevention constants;

whereby at least the amplitudes and phases of the sinusoidal components of the adaptive signal y(n) are replaced with components of the renewed adaptive coefficient vector W(n).

The first aspect of the present cyclic-signal adaptive control method is applicable to cases even where the specific component to be suppressed in the cyclic signal f(n) is a sinusoidal function which includes a single angular frequency $\omega$ alone, where it is a sinusoidal function which includes a plurality of angular frequencies $\omega_k$ being independent of each other, or where it is a combination of a fundamental frequency and harmonic components of the fundamental frequency (i.e., $\omega_k=k\omega_0$).

In the first aspect of the present cyclic-signal adaptive control method, the quasi-normalized gradient method is applied to the adaptive coefficient vector renewing algorithm, a renewing equation of the adaptive coefficient vector W(n). For instance, in the quasi-normalized gradient method, the renewing vector is subtracted from the adaptive coefficient vector W(n). The renewing vector is prepared by multiplying components of the gradient vector $\nabla(n)=\partial e^2(n)/\partial W(n)$ with an appropriate step size parameter, and by dividing the resulting products with the sum $(A_k+\gamma_k)$. Note that the $A_k$ is herein gain measurements or gain estimations of the transfer characteristic corresponding to the angular frequencies $\omega_k$ at a time n; and that the $\gamma_k$ ($0 \leq \gamma_k$) is herein an appropriate divergence prevention constant. Specifically, when the gain $A_k$ is large at the time n, the step size of the adaptive coefficient vector W(n) decreases. On the contrary, when the gain $A_k$ is small at the time n, the step size of the adaptive coefficient vector W(n) increases.

For example, the angular frequencies $\omega_k$ correspond to resonance frequencies at the time n. Hence, in the conventional adaptive control method, the adaptive coefficient vector renewing algorithm is likely to diverge when the gain $A_k$ is large. On the other hand, in the first aspect of the present cyclic-signal adaptive control method, the adaptive coefficient renewing algorithm is inhibited from diverging because the step size of the adaptive coefficient vector W(n) is small under the circumstance or when the gain $A_k$ is large. Thus, the stability of the adaptive control can be improved. Therefore, compared to the conventional adaptive control method which does not employ the quasi-normalized gradient method, the renewing coefficient to be multiplied to the gradient vector $\nabla(n)$ can be set larger.

Whilst, when the gain $A_k$ are small at the time n, the gradient vector $\nabla(n)$ is divided by the sum $(A_k+\gamma_k)$ which is reversibly small now. Accordingly, the renewed step size of the adaptive coefficient vector W(n) increases. As a result, even when the gain $A_k$ is small at the time n, the converging speed of the adaptive coefficient vector renewing algorithm can be improved, and at the same time the characteristic of the adaptive coefficient vector renewing algorithm following the variation of the angular frequencies $\omega_k$ can be upgraded as well.

Therefore, in accordance with the first aspect of the present cyclic-signal adaptive control method, the convergence stability of the adaptive control and the characteristic of the adaptive coefficient vector renewing algorithm following the specific angular-frequency components to be suppressed are compatible with each other even when the adaptive signal y(n) is added at the measurement point by way of the transfer function having a resonance frequency.

Note that, when the gain $A_k$ is 0 ($A_k=0$) even at one point in the variable range of the angular frequencies $\omega_k$, the appropriate divergence prevention constant $\gamma_k$ should be set so that $0<\gamma_k$. On the other hand, when the gain $A_k$ is larger than 0 ($A_k>0$) at any one of the angular frequencies $\omega_k$ in the variable range of the angular frequencies $\omega_k$, the appropriate divergence prevention constant $\gamma_k$ can be set so that $\gamma_k=0$. Moreover, it has been known empirically that the appropriate divergence prevention constant $\gamma_k$ can preferably be set so that $\gamma_k$ are at around an average value of the gain of the transfer characteristic in the variable range of the angular frequencies $\omega_k$, or that the appropriate divergence prevention constant $\gamma_k$ can preferably be set so that $\gamma_k$ are intermediate values between the maximum and minimum values of the gain of the transfer characteristic in the variable range of the angular frequencies $\omega_k$.

The first aspect of the present cyclic-signal adaptive control method is an algorithm in which the adaptive coefficient vector renewing algorithm, one of the DXHS algorithms, is quasi-normalized. Therefore, the first aspect is named as a "quasi-normalized DXHS algorithm". The DXHS algorithms have been discussed earlier as the prior art. Note that the first aspect is also applicable to a variety of algorithms which are improved versions of the DXHS algorithms which are applied for the patent protection in Japan by the same applicant as that of this application. The improved algorithms of a variety of the quasi-normalized DXHS algorithms are also placed in the category of the first aspect.

A second aspect of the present invention is a modified version of the first aspect, wherein:

the adaptive signal generation algorithm is an algorithm for generating the adaptive signal y(n) according to Equation (1) below;

the adaptive coefficient vector W(n) is a vector whose components are the amplitude $a_k(n)$ and phase $\phi_k(n)$ of the sinusoidal components of the adaptive signal rim y(n); and the adaptive coefficient vector renewing algorithm is an algorithm for renewing the adaptive coefficient vector W(n) according to Equation (2) below;

whereby at least the amplitudes $a_k(n)$ and phases $\phi_k(n)$ of the sinusoidal components of the adaptive signal y(n) are replaced with renewed components of the adaptive coefficient vector W(n), the adaptive coefficient vector W(n) being renewed by the adaptive coefficient vector renewing algorithm;

$$y(n) = \sum_{k=1}^{K} a_k(n) \exp[j\{\omega_k Tn + \phi_k(n)\}] \quad \text{Equation (1)}$$

wherein j: Imaginary Unit; and T: Sampling Interval, $1 \leq k \leq K$; $\exp[j\theta]=\cos\theta$; and $j\exp[j\theta]=-\sin\theta$.

$$W(n+1) = \begin{bmatrix} \vdots \\ a_k(n+1) \\ \vdots \\ \phi_k(n+1) \\ \vdots \end{bmatrix} = \begin{bmatrix} \vdots \\ a_k(n) \\ \vdots \\ \phi_k(n) \\ \vdots \end{bmatrix} - \begin{bmatrix} \vdots \\ \frac{\mu_a}{[\gamma+A(\omega_k)]} e(n) \cdot \exp[j\{\omega_k Tn + \phi_k(n) + \Phi(\omega_k)\}] \\ \vdots \\ \frac{\mu_\phi}{[\gamma+A(\omega_k)]} e(n) j\exp[j\{\omega_k Tn + \phi_k(n) + \Phi(\omega_k)\}] \\ \vdots \end{bmatrix} \quad \text{Equation (2)}$$

wherein

γ: Divergence Prevention Constant;

$A(\omega_k)$: Gain Measurements of Transfer Characteristic at Angular Frequencies $\omega_k$; and $\Phi(\omega_k)$: Measurements of Phase Characteristic of Transfer Characteristic at Angular Frequencies $\omega_k$.

The second aspect of the present invention is an example of an adaptive control method for a cyclic signal wherein the above-described first aspect is applied to an adaptive signal generation algorithm defined by Equation (1) above. Specifically, in the second aspect, the adaptive coefficient vector renewing algorithm is defined by Equation (2) above. Thus, the second aspect operates and produces advantages in the same manner as the above-described first aspect.

In order to simply, $\mu_a$ and $\mu_\phi$ substitute for the step size parameters in Equation (2) above. However, different step size parameters $\mu_{ak}$ and $\mu_{\phi k}$ can be set with respect to each of the angular frequencies $\omega_k$.

A third aspect of the present invention is a modified version of the first aspect, wherein:

the adaptive signal generation algorithm is an algorithm for generating the adaptive signal y(n) according to Equation (3) below;

the adaptive coefficient vector W(n) is a vector whose components are both of the amplitudes $\alpha_k(n)$ and $\beta_k(n)$ of vibration components of the adaptive signal y(n); and the adaptive coefficient vector renewing algorithm is an algorithm for renewing the adaptive coefficient vector W(n) according to Equation (4) below;

whereby at least both of the amplitudes $\alpha_k(n)$ and $\beta_k(n)$ of the vibration components of the adaptive signal y(n) are replaced with renewed components of the adaptive coefficient vector W(n), the adaptive coefficient vector W(n) being renewed by the adaptive coefficient vector renewing algorithm;

$$y(n) = \sum_{k=1}^{K} [\alpha_k(n)\sin\{\omega_k Tn\} + \beta_k(n)\cos\{\omega_k Tn\}] \qquad \text{Equation (3)}$$

wherein
T: Sampling Interval, $1 \leq k \leq K$.

$$W(n+1) = \begin{bmatrix} \vdots \\ \alpha_k(n+1) \\ \vdots \\ \beta_k(n+1) \\ \vdots \end{bmatrix} = \begin{bmatrix} \vdots \\ \alpha_k(n) \\ \vdots \\ \beta_k(n) \\ \vdots \end{bmatrix} - \begin{bmatrix} \vdots \\ \frac{\mu_\alpha}{[\gamma + A(\omega_k)]} e(n)\sin[\omega_k Tn + \Phi(\omega_k)] \\ \vdots \\ \frac{\mu_\beta}{[\gamma + A(\omega_k)]} e(n)\cos[\omega_k Tn + \Phi(\omega_k)] \\ \vdots \end{bmatrix} \qquad \text{Equation (4)}$$

wherein
γ: Divergence Prevention Constant;
$A(\omega_k)$: Gain Measurements of Transfer Characteristic at Angular Frequencies $\omega_k$; and
$\Phi(\omega_k)$: Measurements of Phase Characteristic of Transfer Characteristic at Angular Frequencies $\omega_k$.

The third aspect of the present invention is an example of an adaptive control method for a cyclic signal wherein the above-described first aspect is applied to an adaptive signal generation algorithm defined by Equation (3) above. Equation (3) is an orthogonal expression of Equation (1) above. Specifically, in the third aspect, the adaptive coefficient vector renewing algorithm is defined by Equation (4) above. Thus, the third aspect operates and produces advantages in the same manner as the above-described first aspect.

In order to simplify, $\mu_\alpha$ and $\mu_\beta$ substitute for the step size parameters in Equation (4) above. However, different step size parameters $\mu_{\alpha k}$ and $\mu_{\beta k}$ can be set with respect to each of the angular frequencies $\omega_k$.

BRIEF DESCRIPTIONS OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 4 is a diagram for illustrating test results on a situation where no adaptive control was carried out, wherein:

FIG. 4 (a) is a graph for illustrating a level of an adaptive signal y(n); and

FIG. 4 (b) is a graph for illustrating a level of an error signal e(n);

FIG. 5 is a diagram for illustrating test results on a situation where a prior-art adaptive control method was carried out, wherein:

FIG. 5 (a) is a graph for illustrating a level of an adaptive signal y(n); and

FIG. 5 (b) is a graph for illustrating a level of an error signal e(n);

FIG. 6 is a diagram for illustrating test results on a situation where Example No. 1 was carried out, wherein:

FIG. 6 (a) is a graph for illustrating a level of an adaptive signal y(n); and

FIG. 6 (b) is a graph for illustrating a level of an error signal e(n);

FIG. 10 is a diagram for illustrating test results on a situation where no adaptive control was carried out, wherein:

FIG. 10 (a) is a graph for illustrating a level of an adaptive signal y(n); and

FIG. 10 (b) is a graph for illustrating a level of an error signal e(n);

FIG. 11 is a diagram for illustrating test results on a situation where a comparative adaptive control method was carried out, wherein:

FIG. 11 (a) is a graph for illustrating a level of an adaptive signal y(n); and

FIG. 11 (b) is a graph for illustrating a level of an error signal e(n);

FIG. 12 is a diagram for illustrating test results on a situation where Example No. 2 was carried out, wherein:

FIG. 12 (a) is a graph for illustrating a level of an adaptive signal y(n); and

FIG. 12 (b) is a graph for illustrating a level of an error signal e(n);

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Preferred Embodiments of an adaptive control method for a cyclic signal according to the present invention, the "quasi-normalized DXHS algorithm", will be hereinafter described clearly and fully with reference to the following examples so that a person having ordinary skill in the art can understand and carry out the present invention.

EXAMPLE NO. 1

(Arrangement of Example No. 1)

Figure 1:
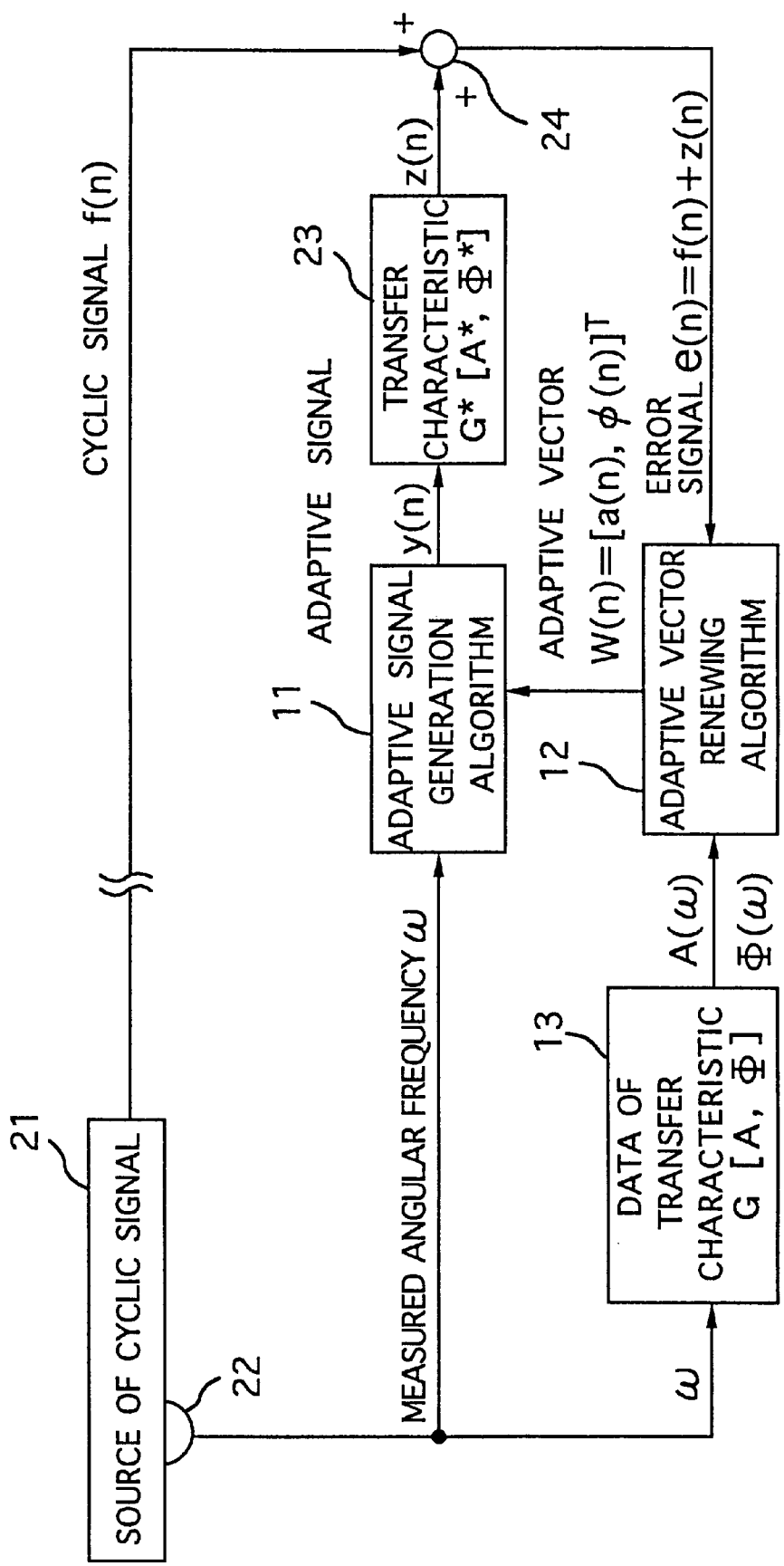
FIG. 1 is a system block diagram for illustrating Example No. 1 of an adaptive control method for a cyclic signal according to the present invention.

An adaptive control method for a cyclic signal, or the "quasi-normalized DXHS algorithm", will be hereinafter described as Example No. 1 according to the present invention. As illustrated in FIG. 1, Example No. 1 is one of the adaptive control methods for canceling an influence of a cyclic signal f(n) which comes from a cyclic signal resource 21 and is added at a measurement point 24. Specifically, an adaptive control method of Example No. 1 is a method in which an adaptive control signal y(n) is added to the cyclic signal f(n) by way of a transfer characteristic G* of a transfer system 23 and a specific component of the cyclic signal f(n) is canceled to suppress an error signal e(n). In Example No. 1, the specific component to be suppressed in the cyclic signal f(n) is assumed to be a component of a single angular frequency only, and the adaptive signal y(n) is defined as a simple harmonic oscillation having a single angular frequency $\omega$. Here, the true angular frequency $\omega^*$ of the cyclic signal f(n) is measured by angular frequency measuring means 22 with full accuracy, and is given to an adaptive signal generation algorithm 11 and a memory 13. In the memory 13, data of transfer characteristic are stored.

In Example No. 1, the adaptive signal y(n) is generated with respect to the cyclic signal f(n). The cyclic signal f(n) includes a signal component of an angular frequency $\omega^*$, and is input to the measurement point 24. The adaptive signal y(n) is a sinusoidal signal whose angular frequency is the angular frequency $\omega$, the fully precise measurement of the true angular frequency $\omega^*$. The adaptive signal y(n) is added in an inverted phase at the measurement point 24 by way of the transfer system 23 having the predetermined transfer characteristic G*, and then eliminates actively the influence of the specific component of the cyclic signal f(n) to the measurement point 24. As a result, the adaptive control signal y(n) is adjusted appropriately in terms of an amplitude a(n) and phase $\phi(n)$ so that the error signal e(n) detected at the measurement point 24 can be suppressed.

Note that the adaptive signal generation algorithm 11 is herein an algorithm for generating the adaptive signal y(n) at each time n in a discrete time in accordance with Equation (5) below.

$$y(n)=a(n)\exp[j\{\omega Tn+\phi(n)\}]\qquad\text{Equation (5)}$$

wherein j: Imaginary Unit; T: Sampling Interval; $\exp[j\theta]=\cos\theta$; and $j\exp[j\theta]=-\sin\theta$.

Whilst, an adaptive coefficient vector renewing algorithm 12 is an algorithm which renews the adaptive coefficient vector W(n) by the quasi-normalized gradient method. In the algorithm, a vector is subtracted from the adaptive coefficient vector $W(n)=[a(n), \phi(n)]^T$. The vector is prepared by multiplying components of a gradient vector $\nabla(n)=\partial e^2(n)/\partial W(n)$ with appropriate step size parameters, and by dividing the resulting products with a sum $[A(\omega)+\gamma]$. Note that, in the sum, $A(\omega)$ is a gain measurement of the transfer characteristic G* of the transfer system 23, and corresponds to the angular frequency $\omega$, and that $\gamma(0\leq\gamma)$ is an appropriate divergence prevention constant.

Specifically, the adaptive coefficient vector W(n) is a vector whose components are the amplitude a(n) and $\phi(n)$ of the sinusoidal components of the adaptive signal y(n). The adaptive coefficient vector renewing algorithm 12 is an algorithm which renews the adaptive coefficient vector W(n) in accordance with Equation (6) below. In this Equation (6), the renewed components of the adaptive coefficient vector W(n), which are prepared by the DXHS type adaptive coefficient vector renewing algorithm, are divided by the sum $[A(\omega)+\gamma]$. The DXHS type adaptive coefficient vector renewing algorithm is disclosed in the publication discussed in the "Description of the Related Art" section.

$$W(n+1) = \begin{bmatrix} a(n+1) \\ \phi(n+1) \end{bmatrix} = \begin{bmatrix} a(n) \\ \phi(n) \end{bmatrix} - \begin{bmatrix} \frac{\mu_a}{[\gamma+A(\omega)]}e(n)\cdot\exp[j\{\omega Tn+\phi(n)+\Phi(\omega)\}] \\ \frac{\mu_\phi}{[\gamma+A(\omega)]}e(n)j\exp[j\{\omega Tn+\phi(n)+\Phi(\omega)\}] \end{bmatrix} \qquad\text{Equation (6)}$$

wherein $\gamma$: Divergence Prevention Constant;

$A(\omega)$: Gain Measurement of Transfer Characteristic at Angular Frequency $\omega$; and $\Phi(\omega)$: Measurement of Phase Characteristic of Transfer Characteristic at Angular Frequency $\omega$.

Then, with the components of the adaptive coefficient vector W(n) renewed by the adaptive coefficient vector renewing algorithm 12, the amplitude a(n) and phase $\phi(n)$ of the adaptive signal y(n) are replaced in the adaptive signal generation algorithm 11. Thus, an appropriate adaptive signal y(n) can be generated.

Note that Example No. 1 of the present cyclic-signal adaptive control method is the simplest case where K is designated at 1 (i.e., K=1) in the second aspect described above.

(Operation and Advantages of Example No. 1)

Example No. 1 of the present cyclic-signal adaptive control method is arranged as described above, and accordingly operates and produces advantages as hereinafter described.

In Example No. 1, the quasi-normalized gradient method set forth in Equation (6) above is employed in the adaptive coefficient vector renewing algorithm 12, the renewing equation for the adaptive coefficient vector W(n). For instance, the sum $[A(\omega)+\gamma]$ is used in which the appropriate divergence prevention constant $\gamma$ is added to the gain measurement $A(\omega)$ of the transfer system 23 of the transfer characteristic G*. The gain measurement $A(\omega)$ corresponds to the angular frequency $\omega$ at each discrete time n, and the appropriate divergence prevention constant $\gamma$ is $0\leq\gamma$.

Specifically, the renewed vector divided by the sum $[A(\omega)+\gamma]$ is subtracted from the adaptive coefficient vector $W(n)$ at the current time n, and a new adaptive coefficient vector $W(n+1)$ is obtained. As a result, when the gain measurement A is large at the time n, the step size of the adaptive coefficient vector $W(n)$ decreases. On the other hand, when the gain measurement A is small, the step size of the adaptive coefficient vector $W(n)$ increases.

When the angular frequency ω corresponds to the resonance frequency of the transfer system 23 at a time n, and when the gain $A^*$ of the transfer characteristic $G^*$ of the transfer system 23 is large, the prior-art adaptive coefficient vector renewing algorithm is likely to diverge. On the other hand, in Example No. 1, the adaptive coefficient renewing algorithm 12 is inhibited from diverging because the step size of the adaptive coefficient vector $W(n)$ is small under the circumstance or when the gain $A^*$ is large. Thus, the stability of the adaptive control can be improved. Hence, compared to the conventional adaptive control method which does not employ the quasi-normalized gradient method, the renewing coefficients (i.e., the step size parameters $\mu_a$ and $\mu_\phi$) to be multiplied to the gradient vector $\nabla(n)$ can be set larger.

Whilst, when the gain measurement A of the transfer characteristic $G^*$ of the transfer system 23 is small at the time n, the gradient vector $\nabla(n)$ is divided by the sum $[A(\omega)+\gamma]$ which is reversibly small now. Accordingly, the renewed step size of the adaptive coefficient renewing vector $W(n)$ increases. As a result, when the measurement of the gain A is small at the time n, the converging speed of the adaptive coefficient vector renewing algorithm can be improved, and at the same time the characteristic of the adaptive coefficient vector renewing algorithm 12 following the variation of the angular frequency ω can be upgraded as well.

Therefore, in accordance with Example No. 1 of the present cyclic-signal adaptive control method, the convergence stability of the adaptive control and the characteristic following the variation of the frequency in the specific angular-frequency component to be suppressed are compatible with each other even when the adaptive signal $y(n)$ is added at the measurement point 24 by way of the transfer characteristic $G^*$ having the resonance frequency.

(Evaluation Test on Example No. 1)

Figure 2:
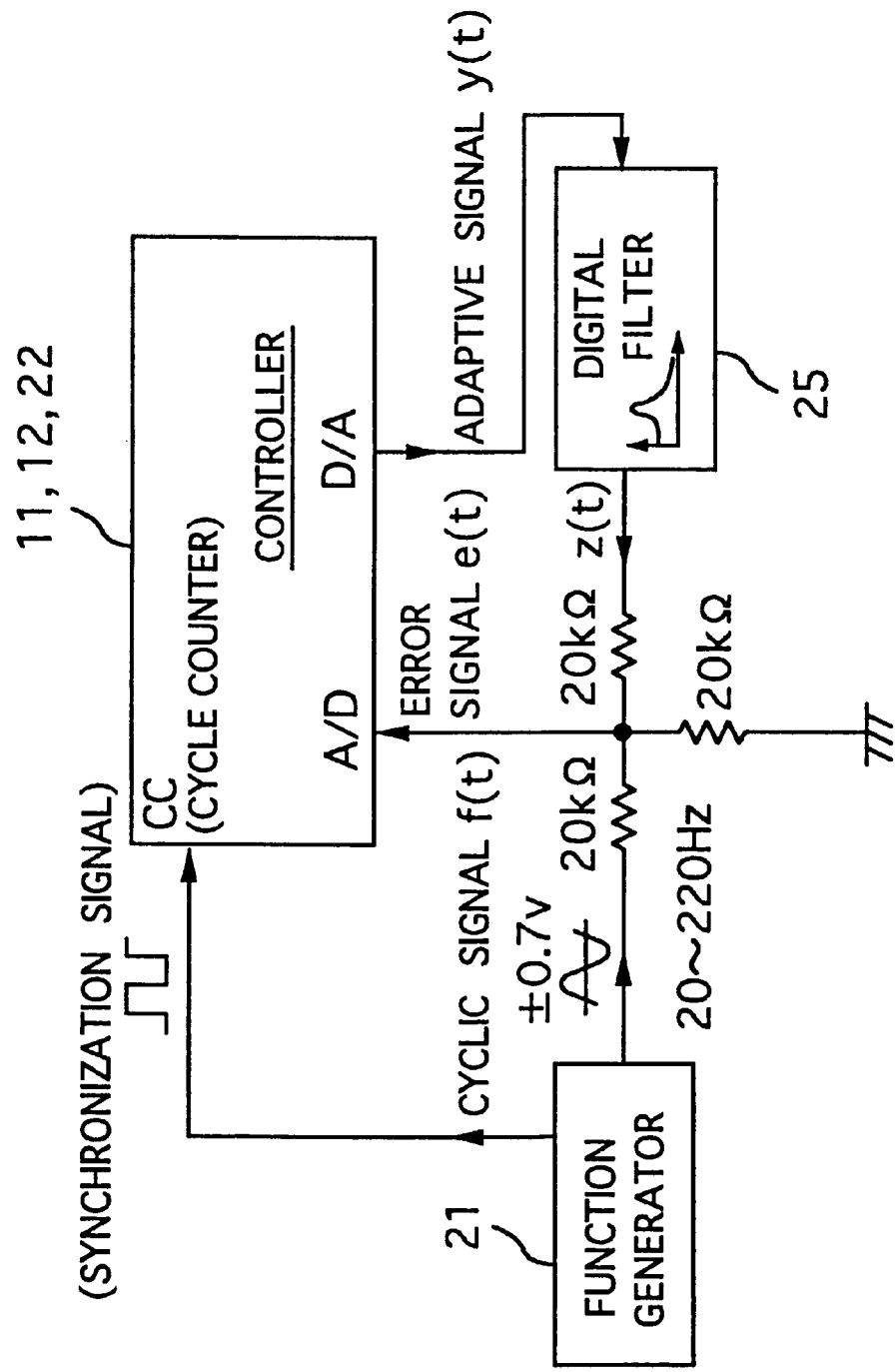
FIG. 2 is a circuit diagram for illustrating an arrangement of a testing apparatus for evaluating Example No. 1.
Figure 3:
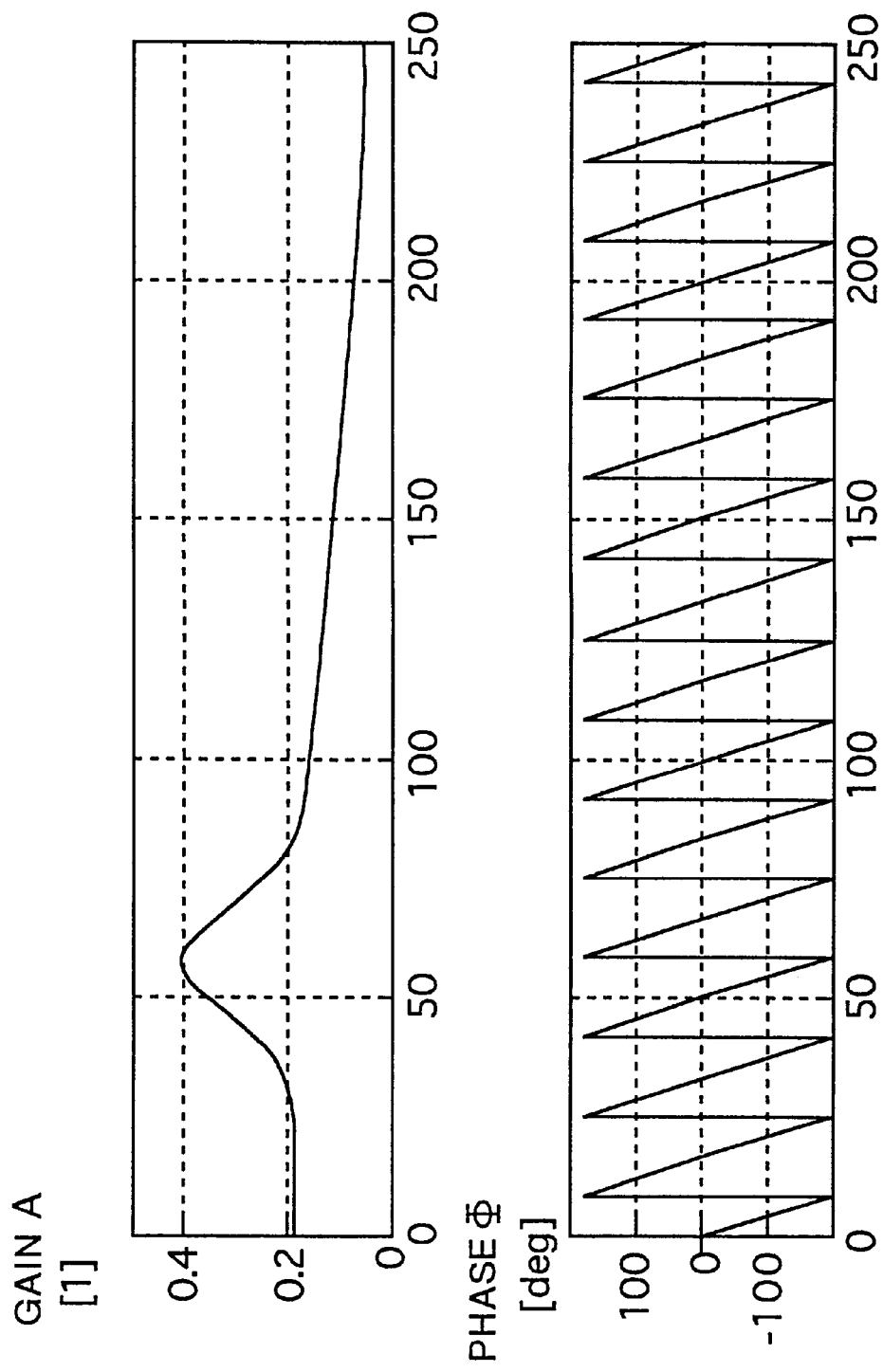
FIG. 3 is a Bode diagram for illustrating a transfer characteristic of a digital filter which is employed in the testing apparatus.

In order to confirm the effectiveness of Example No. 1 of the present cyclic-signal adaptive control method, an evaluation test was carried out by using a testing apparatus whose arrangement is illustrated in FIG. 2. In the drawing, a digital filter 25 exhibited a transfer characteristic which had a resonance characteristic. FIG. 3 illustrates the resonance characteristic as a Bode diagram. As shown in the drawing, the digital filter 25 exhibited a resonance characteristic which had a peak at around a frequency of 55 Hz.

In the adaptive coefficient vector renewing algorithm 12 used in the test, the step size parameters were $\mu_a$=0.008 and $\mu_\phi$=0.08 for Example No. 1, and were $\mu_a$=0.014 and $\mu_\phi$=0.14 for the prior-art cyclic-signal adaptive control method which was tested for comparison. Note that, when Example No. 1 of the present cyclic-signal adaptive control method was carried out, the value of the divergence prevention constant γ was set as γ=0.162.

In this test, a cyclic signal $f(n)$ was generated by a voltage whose amplitude was 0.7 V in a region of a continuous time t. The frequencies of the cyclic signal $f(n)$ were swept from 20 Hz to 220 Hz for 10 seconds relatively rapidly. The results of the test will be described briefly with reference to FIGS. 4 through 7.

Figure 4:
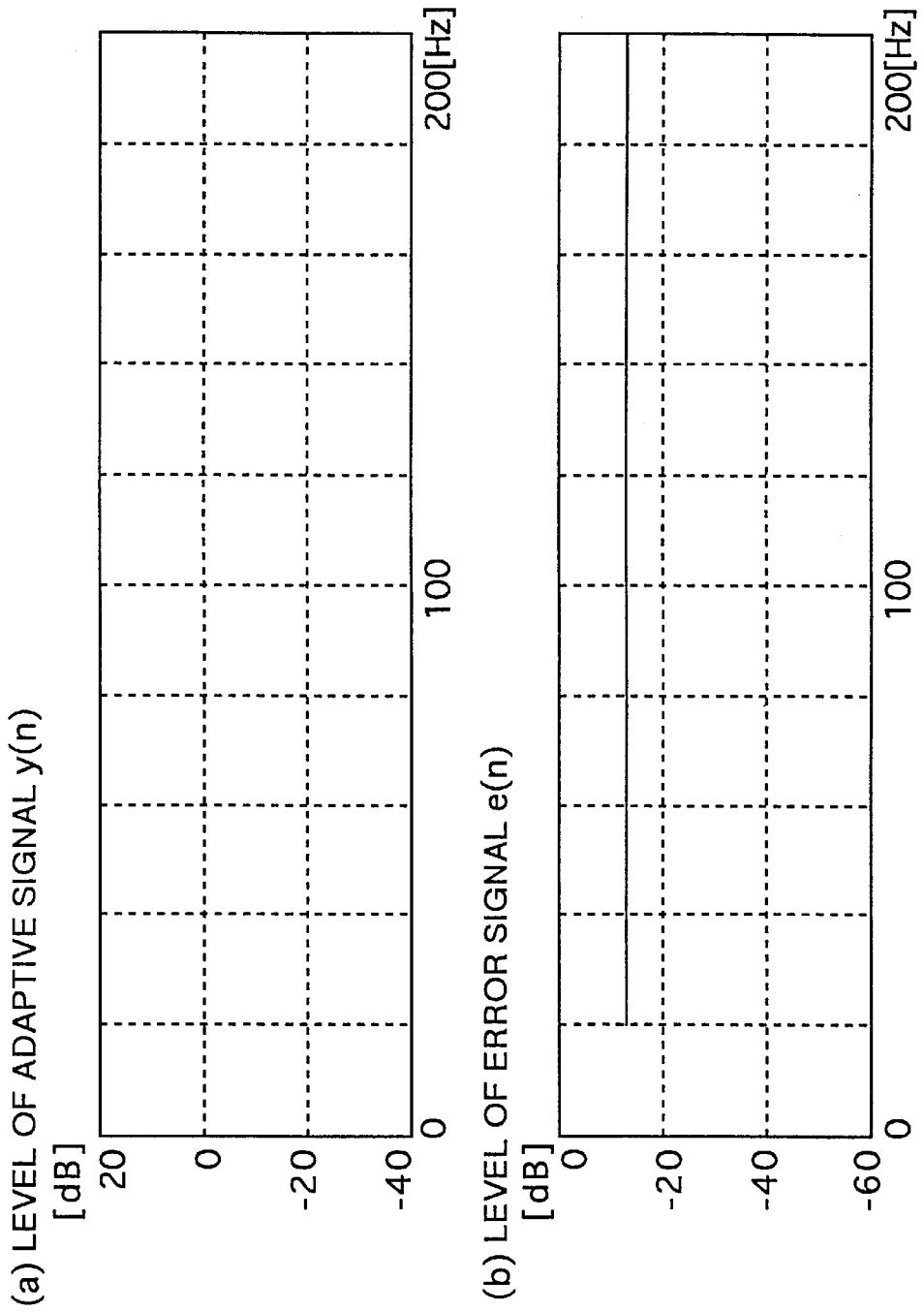

Firstly, when no control was carried out; namely: when the vibration was kept going by the cyclic signal $f(n)$ without control, no adaptive signal $y(n)$ was present; and the level of the error signal $e(n)$ was kept constant regardless of the frequencies as illustrated in FIGS. 4 (a) and 4 (b). Here, the level of the error signal $e(n)$ was not 0 dB, but was −12.7 dB which was smaller than the partial pressure value derived from the resistance. Note that −12.7 dB corresponded to an amplitude of about 0.23 V. This is believed to result from the fact that the signal was damped because the impedances of the connected apparatuses were not high relatively. In any case, the test results can be compared with each other in terms of the relative values, because the level of the error signal $e(n)$ was expressed by the units of dB.

Figure 5:
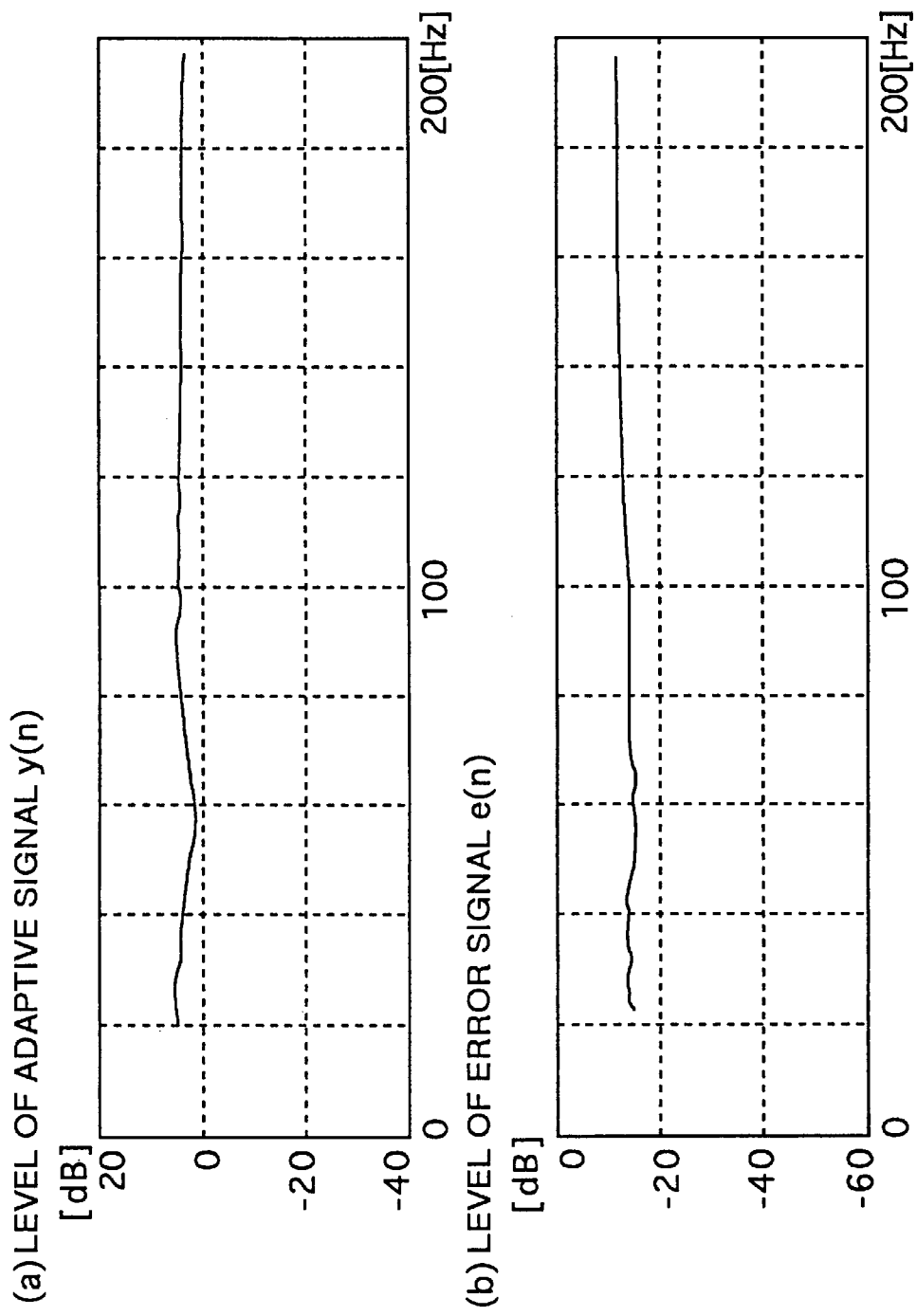

Then, the prior-art adaptive control based on the DXHS algorithm was carried out. Note that, contrary to the adaptive coefficient vector renewing algorithm 12 of Example No. 1, the products of the gradient vector $\nabla(n)$ and the appropriate step size parameters were not divided by the sum $[\gamma+A(\omega)]$ in the prior-art adaptive control. When the prior-art adaptive control was carried out, the adaptive signal $y(n)$ was generated as illustrated in FIG. 5 (a). However, when the frequencies were swept rapidly as aforementioned, the effect of canceling the cyclic signal $f(n)$ was not produced substantially by the adaptive signal $y(n)$ as illustrated in FIG. 5 (b). More specifically, in the frequency region of 100 Hz or less, the situation was improved slightly with respect to the case where no control was carried out as aforementioned. The improvement was, however, 0 to 3 dB at the highest. On the other hand, in the frequency region of more than 100 Hz, the level of the error signal $e(n)$ was higher than the case where no control was carried out. Thus, the level of the error signal $e(n)$ was deteriorated.

Thus, when the frequencies were swept rapidly as in this test, it is impossible to say that the prior-art adaptive control can improve the control performance with respect to the case where no control is carried out. Therefore, it is apparent that the prior-art adaptive control does not produce the advantages of the adaptive control. Note that, however, the following advantage of the prior-art adaptive control was confirmed. Although not shown in the drawings, when the frequencies were swept sufficiently slowly (i.e., during slow sweeping), the prior-art adaptive control could reduce the level of the error signal $e(n)$ by 20 dB or more.

Figure 6:
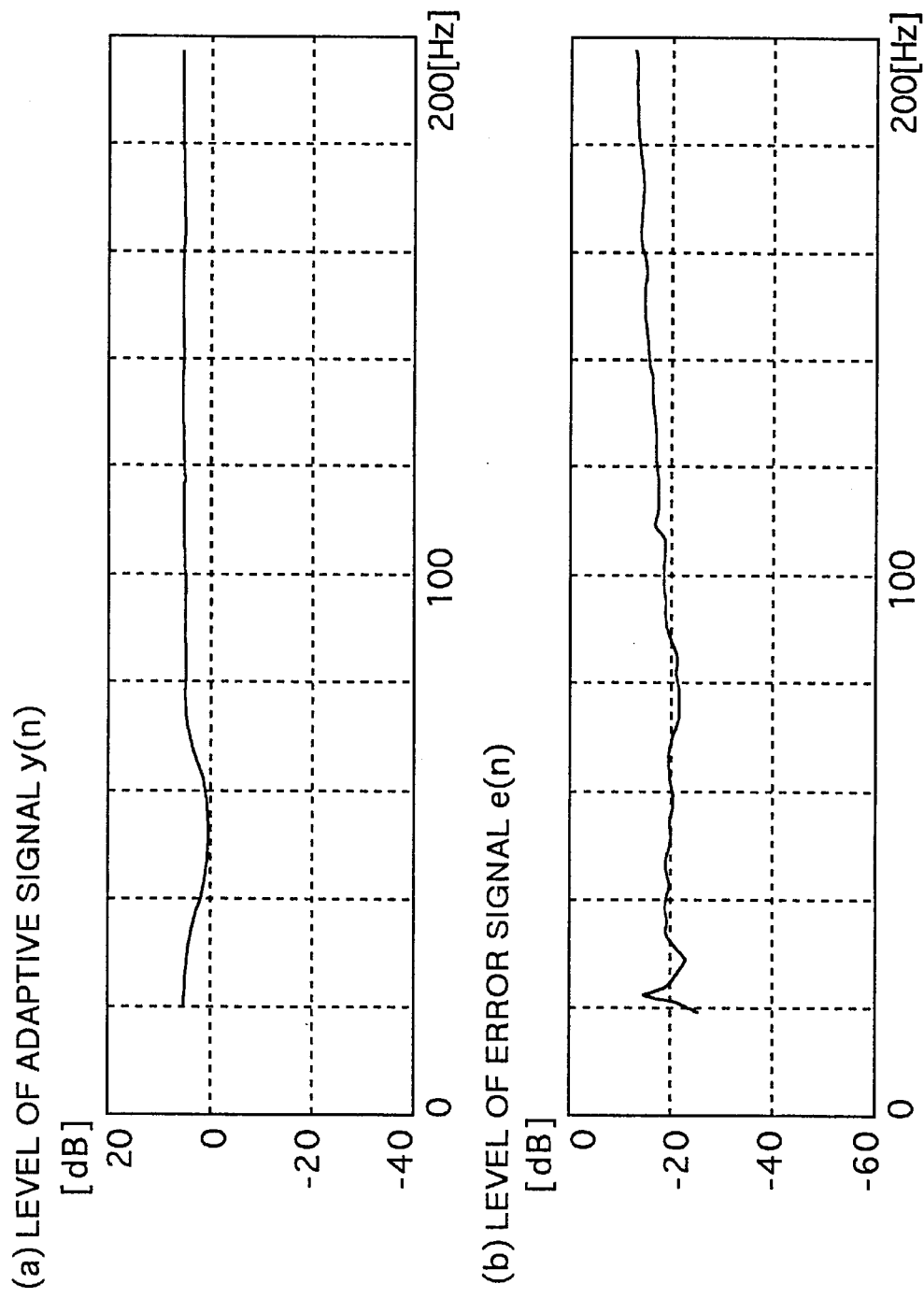

Finally, when Example No. 1 of the present cyclic-signal adaptive control method was carried out, the adaptive signal $y(n)$ was generated at an appropriate level, and the error signal $e(n)$ was reduced to a significant level as illustrated in FIGS. 6 (a) and 6 (b). More specifically, in the region where the frequency was less than 100 Hz, the error signal $e(n)$ was reduced by 10 dB approximately. In the region where the frequency was 100 Hz or more, the reduction effect of the error signal $e(n)$ was produced to an extent of several dB, though the reduction effect was diminished as the frequency approached 200 Hz.

Figure 7:
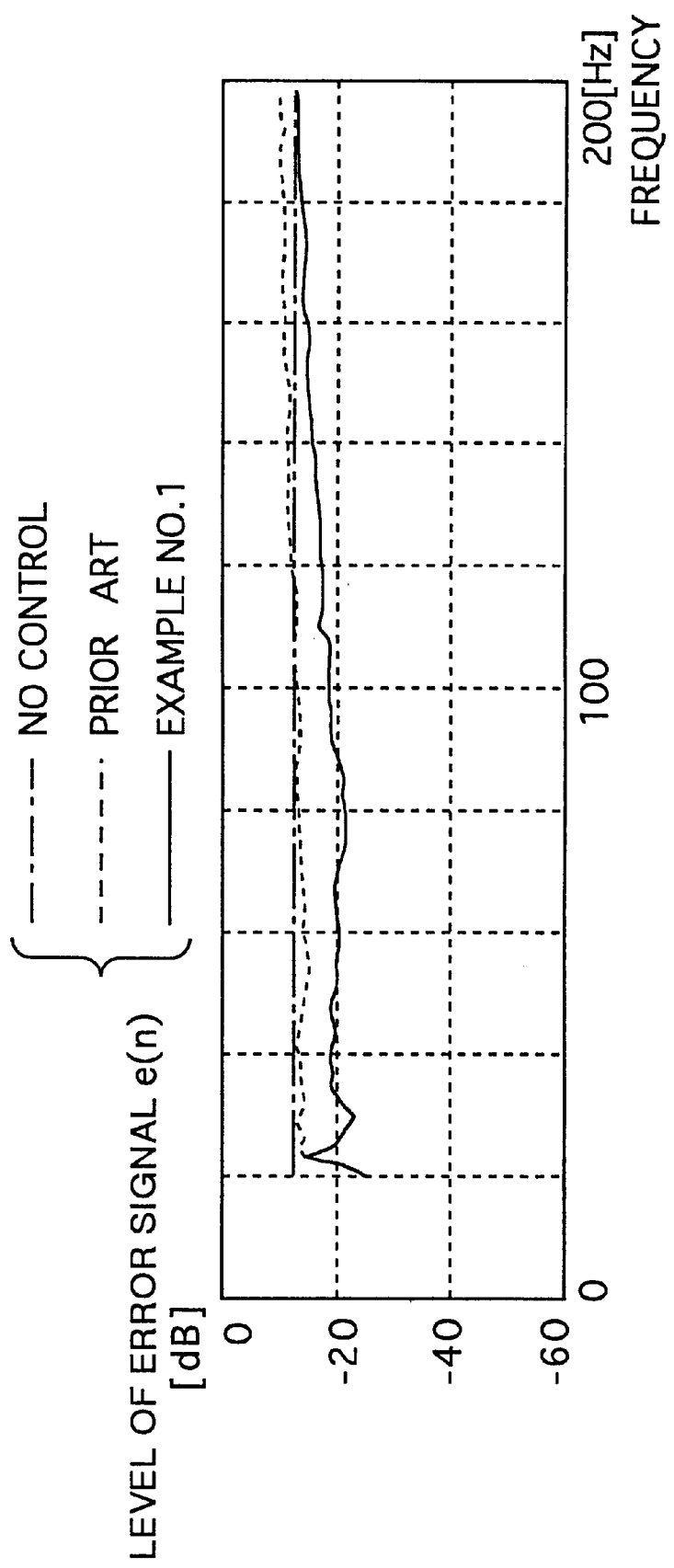
FIG. 7 is a graph for justifying the advantages of the adaptive control which were produced by Example No. 1.

To summarize the foregoing discussions, the levels of the error signals $e(n)$ of all the cases, where no control was carried out, where the prior-art adaptive control was carried out, and where Example No. 1 was carried out, are illustrated in FIG. 7 in a superimposed manner. As shown in the drawing, over the entire region of from 20 to 200 Hz where the frequencies were swept rapidly, the level of the error signal $e(n)$ in Example No. 1 was reduced by several dB to ten dB more than the level of the error signal $e(n)$ in the prior-art adaptive control. It is apparent from the results of these tests that, while securing the convergence stability of the adaptive control, Example No. 1 could improve the adaptability against the rapid frequency sweeping more than the prior-art adaptive control did.

Modified Version of Example No. 1

Figure 8:
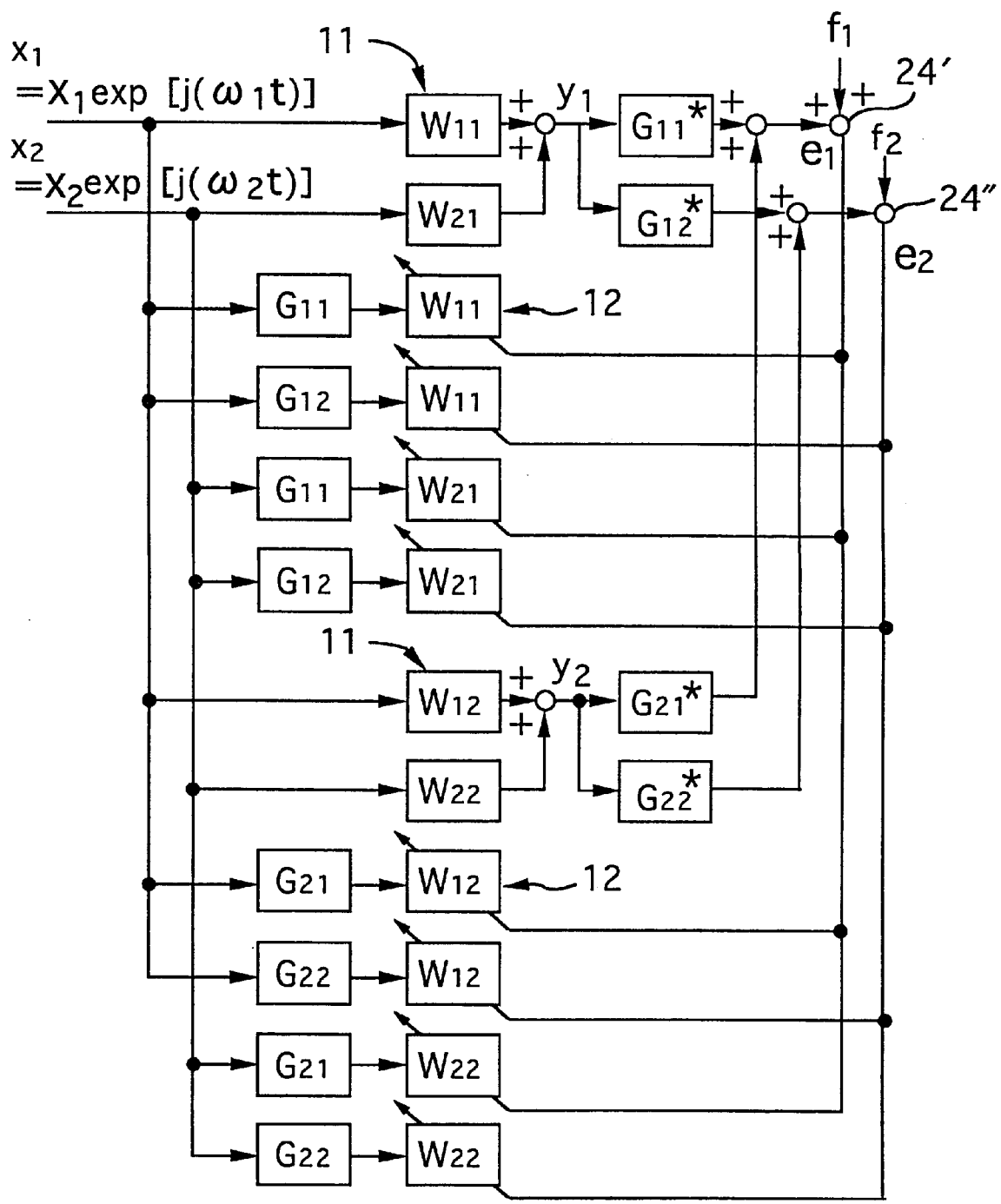
FIG. 8 is a system block diagram for illustrating a modified version of Example No. 1 of the present cyclic-signal adaptive control method.

A modified version of Example No. 1 is illustrated in FIG. 8. As shown in the drawing, the "quasi-normalized DXHS algorithm" can be carried out so that the present cyclic-signal adaptive control method is expanded to a multi-input/multi-output system in which a plurality of angular frequency components are suppressed. In FIG. 8, the adaptive signal generation algorithm 11 is considered and illustrated as an adaptive filter. Note that, however, the adaptive signal generation algorithm 11 is the same as the adaptive signal generation algorithm 11 shown in FIG. 1 essentially. This modified version is the simplest version, and exemplifies a two-input/two-output system to which cyclic signals having two angular frequencies are input. The angular frequencies of the cyclic signals $f_1(n)$ and $f_2(n)$ to be suppressed are two angular frequencies $\omega_1$ and $\omega_2$. It is unnecessary that the two angular frequencies are a fundamental frequency and a harmonic component of the fundamental frequency with each other.

As set forth in Equation (7) below, the adaptive signal generation algorithm 11 of this modified version is an algorithm for generating two adaptive signals $y_m(n)$ (m=1 and 2). Whilst, as set forth in Equation (8) below, the adaptive coefficient vector renewing algorithm 12 is an algorithm for adaptively adjusting the amplitudes $a_{km}(n)$ and phases $\phi_{km}(n)$ of the two adaptive signals $y_m(n)$ by the quasi-normalized algorithm.

$$y_m(n) = \sum_{k=1}^{K} a_{km}(n)\exp[j\{\omega_k Tn + \phi_{km}(n)\}] \quad \text{Equation (7)}$$

wherein K=2, and m=1 and 2.

$$W_{km}(n+1) = \begin{bmatrix} a_{km}(n+1) \\ \phi_{km}(n+1) \end{bmatrix} = \begin{bmatrix} a_{km}(n) \\ \phi_{km}(n) \end{bmatrix} - \quad \text{Equation (8)}$$

$$\begin{bmatrix} \sum_{l=1}^{L} \frac{\mu_{akbm}}{[\gamma_{lm} + A_{lm}(\omega_k)]} e_1(n) \cdot \exp[j\{\omega_k Tn + \phi_{km}(n) + \Phi_{lm}(\omega)\}] \\ \sum_{l=1}^{L} \frac{\mu_{\phi klm}}{[\gamma_{lm} + A_{lm}(\omega_k)]} e_1(n) \cdot j\exp[j\{\omega_k Tn + \phi_{km}(n) + \Phi_{lm}(\omega)\}] \end{bmatrix}$$

wherein k=1 and 2, L=2, m=1 and 2.

Thus, even in the two-input/two-output system, this modified version can produce the advantages of the adaptive control in the same manner as Example No. 1 described above. By amplifying the modified version, it is easy to expand the modified version to an L-input/M-output system for K components ($1 \leq K$, L and M).

EXAMPLE NO. 2

(Arrangement of Example No. 2)

Figure 9:
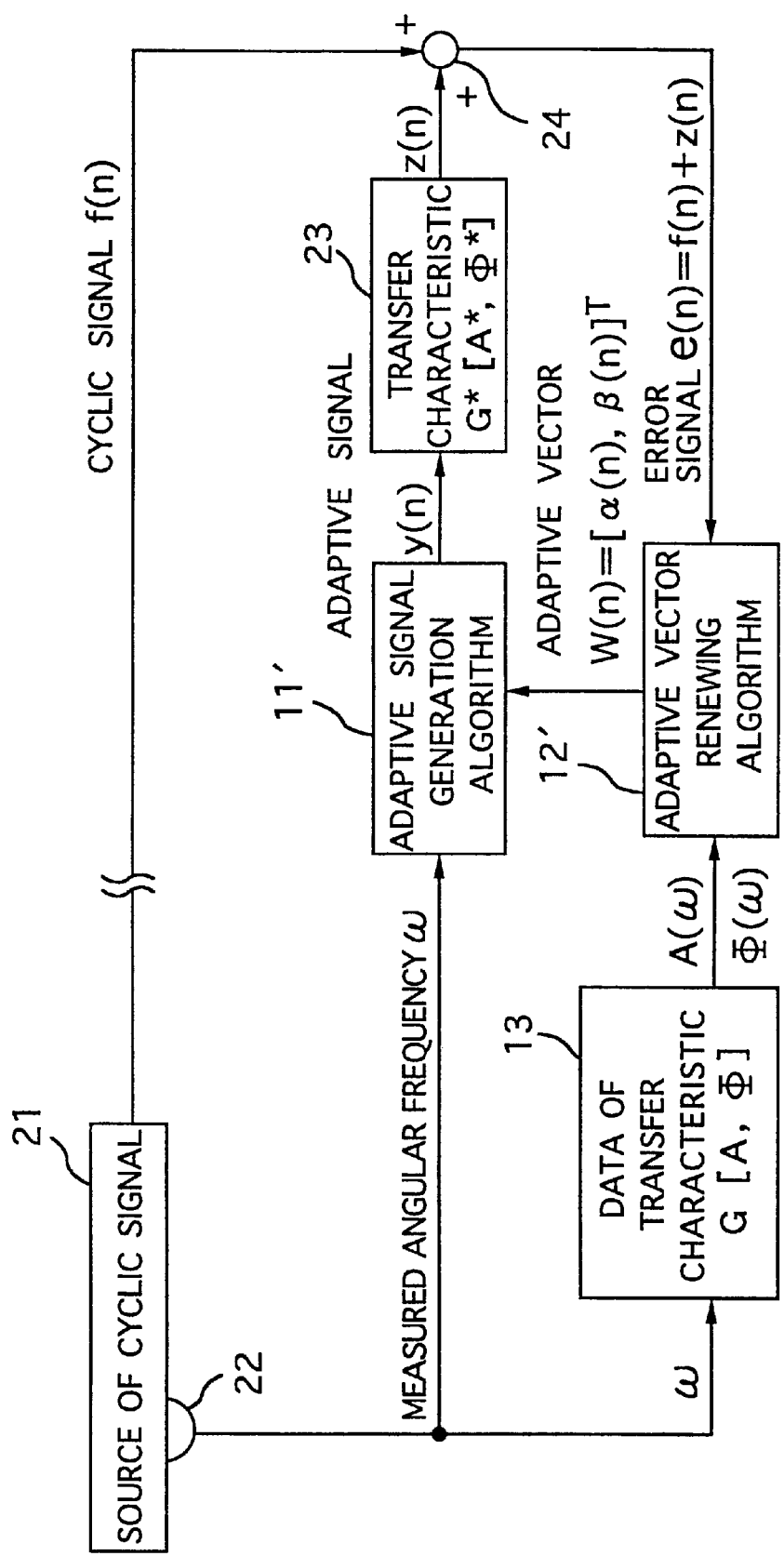
FIG. 9 is a system block diagram for illustrating Example No. 2 of an adaptive control method for a cyclic signal according to the present invention.

Another adaptive control method for a cyclic signal, or the other "quasi-normalized DXHS algorithm", will be hereinafter described as Example No. 2 according to the present invention. Example No. 2 is a rewritten version of Example No. 1 described above. Example No. 1 is herein rewritten in an orthogonalized expression. Specifically, as illustrated in FIG. 9, Example No. 2 employs an adaptive signal generation algorithm 11' which is a rewritten version of the adaptive signal generation algorithm 11 of Example No. 1. For instance, the adaptive signal generation algorithm 11 of Example No. 1 is rewritten in an orthogonalized expression as set forth in Equation (9) below.

$$y(n)=\alpha(n) \sin\{\omega Tn\}+\beta(n) \cos\{\omega Tn\} \quad \text{Equation (9)}$$

wherein

T: Sampling Interval.

In Example No. 2, the components of the adaptive coefficient vector W(n) include the amplitude $\alpha(n)$ of the sine components of the orthogonalized adaptive signal generation algorithm 11', and the amplitude $\beta(n)$ of the cosine components of the orthogonalized adaptive signal generation algorithm 11'. Specifically, the adaptive coefficient vector W (n) is an equation of the form $W(n)=[\alpha(n), \beta(n)]^T$.

Accordingly, an adaptive coefficient vector renewing algorithm 12' corresponding to the adaptive signal generation algorithm 11' is a quasi-normalized renewing algorithm as set forth in Equation (10) below.

$$W(n+1) = \begin{bmatrix} \alpha(n+1) \\ \beta(n+1) \end{bmatrix} = \begin{bmatrix} \alpha(n) \\ \beta(n) \end{bmatrix} - \quad \text{Equation (10)}$$

$$\begin{bmatrix} \frac{\mu_\alpha}{[\gamma + A(\omega)]} e(n)\sin[\omega Tn + \Phi(\omega)] \\ \frac{\mu_\beta}{[\gamma + A(\omega)]} e(n)\cos[\omega Tn + \Phi(\omega)] \end{bmatrix}$$

wherein $\gamma$: Divergence Prevention Constant;

$A(\omega)$: Gain Measurement of Transfer Characteristic at Angular Frequency $\omega$; and $\Phi(\omega)$: Measurement of Phase Characteristic of Transfer Characteristic at Angular Frequency $\omega$.

(Operation and Advantages of Example No. 2)

Example No. 2 of the present cyclic-signal adaptive control method is the rewritten version of Example No. 1, and is the orthogonalized expression of Example No. 1. Accordingly, in terms of the operation and advantages, no essential difference arises between Example Nos. 1 and 2. In other words, Example No. 2 of the present cyclic-signal adaptive control method operates and produces advantages in the same manner as Example No. 1.

Therefore, the convergence stability of the adaptive control and the characteristic following the variation of the frequency in the specific angular-frequency component to be suppressed are compatible with each other even when the adaptive signal y(n) is added at the measurement point 24 by way of the transfer characteristic G* having the resonance frequency.

(Evaluation Test on Example No. 2)

In order to confirm the effectiveness of Example No. 2 of the present cyclic-signal adaptive control method, the testing apparatus whose arrangement is illustrated in FIG. 2 was used again to carry out an evaluation test. The digital filter 23 shown in the drawing had the same transfer characteristic as the one used to evaluate Example No. 1.

In the adaptive coefficient vector renewing algorithm 12' used in the test, the step size parameters were $\mu_\alpha=\mu_\beta=0.04$ for Example No. 2, and were $\mu_\alpha=\mu_\beta=0.07$ for the prior-art cyclic-signal adaptive control method which was tested for comparison. Note that, when Example No. 2 of the present cyclic-signal adaptive control method was carried out, the value of the divergence prevention constant $\gamma$ was set as $\gamma=0.162$ in the same manner as the evaluation test on Example No. 1 described above.

In this test, similarly to Example No. 1, a cyclic signal f(n) was generated by a voltage whose amplitude was 0.7 V in a region of a continuous time t. The frequencies of the cyclic signal f(n) were swept from 20 Hz to 220 Hz for 10 seconds relatively rapidly. The results of the test will be described briefly with reference to FIGS. 10 through 13.

Figure 10:
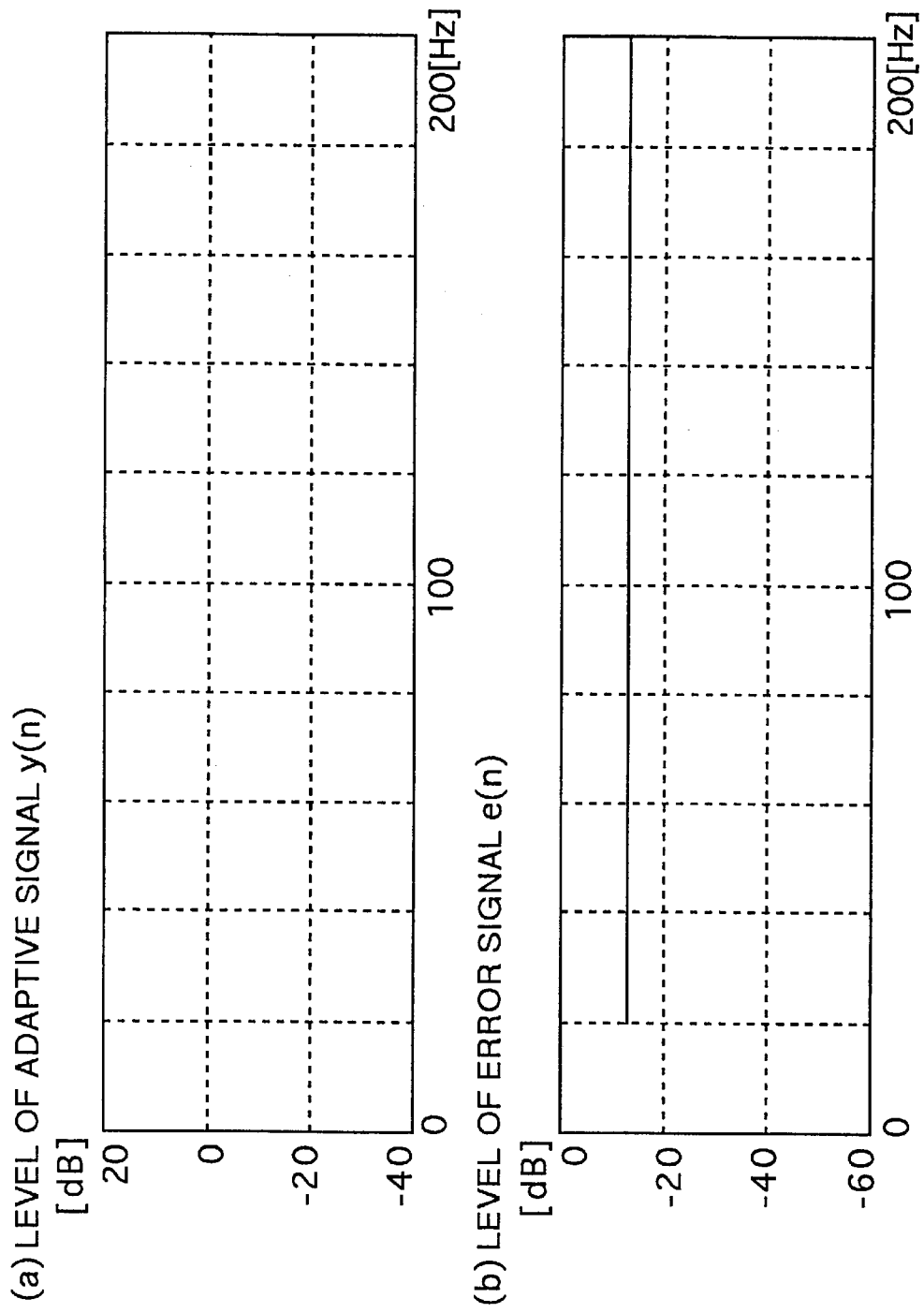

Firstly, when no control was carried out; namely: when the vibration was kept going by the cyclic signal f(n) without control, no adaptive signal y(n) was present; and the level of the error signal e(n) was kept constant regardless of the frequencies as illustrated in FIGS. 10 (a) and 10 (b). Here, the reason why the level of the error signal e(n) was not 0 dB is the same as set forth in the Evaluation Test on Example No. 1. Hence, the test results can be compared with each other in terms of the relative values, because the level of the error signal e(n) was expressed by the units of dB.

Figure 11:
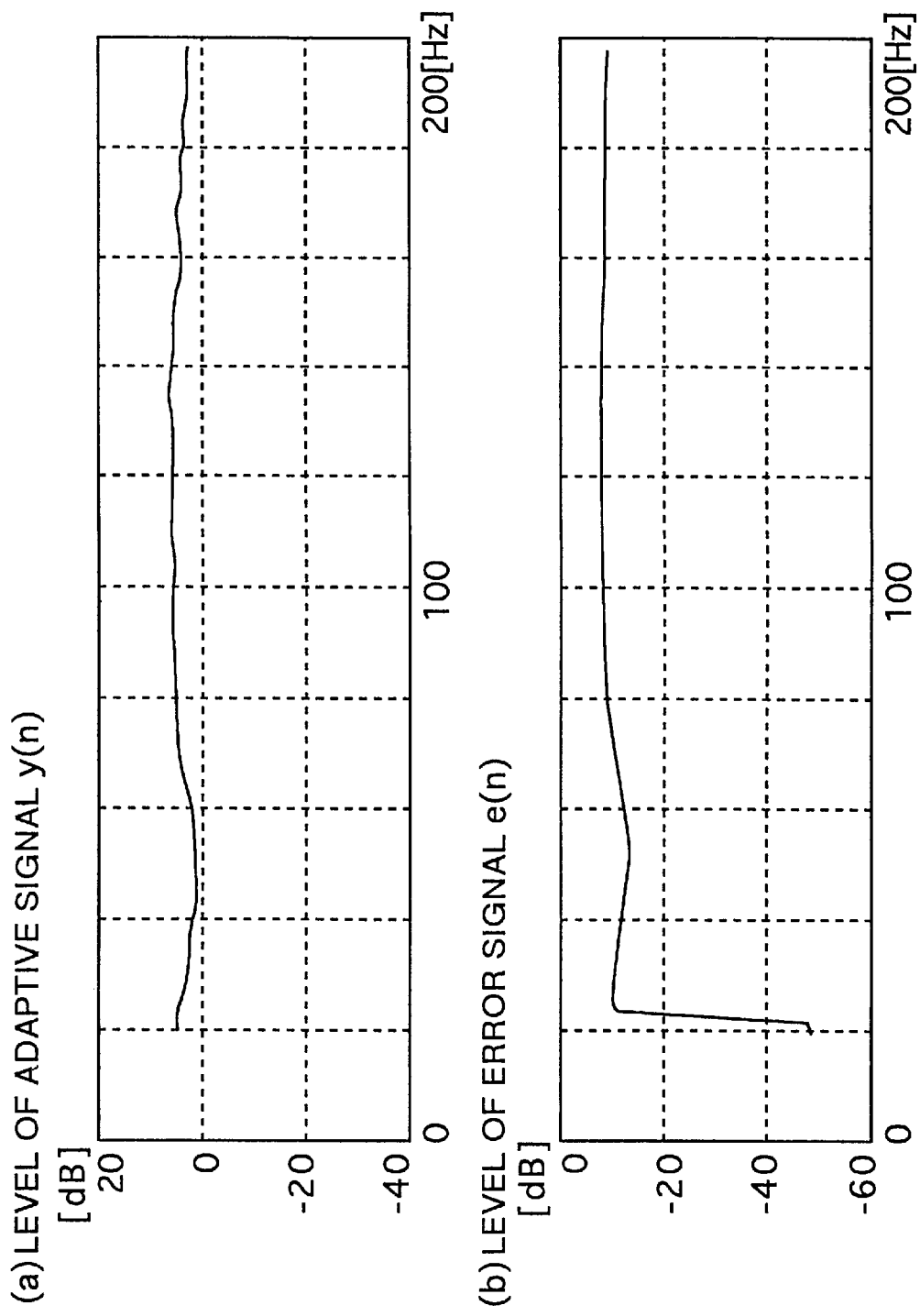

Then, the comparative adaptive control based on the orthogonalized DXHS algorithm was carried out. Note that, contrary to the adaptive coefficient vector renewing algorithm 12' of Example No. 2, the products of the gradient vector $\nabla(n)$ and the appropriate step size parameters were not divided by the sum $[\gamma+A(\omega)]$ in the comparative adaptive control. When the comparative adaptive control was carried out, the adaptive signal y(n) was generated as illustrated in FIG. 11 (a). However, when the frequencies were swept rapidly as aforementioned, the effect of canceling the cyclic signal f(n) was not produced substantially by the adaptive signal y(n) as illustrated in FIG. 11 (b). The level of the error signal tended to be rather higher than the case where no control was carried out as described above. More specifically, in almost all the frequency region, the level of the error signal was slightly higher than the case where no control was carried out. Thus, the control performance was rather deteriorated with respect to the case where no control was carried out.

Thus, when the frequencies were swept rapidly as in this test, the comparative adaptive control could not improve the control performance with respect to the case where no control was carried out, but it rather deteriorated the control performance. Therefore, it is apparent that no such adaptive control should rather preferably carried out. Note that, however, the following advantage of the comparative adaptive control was confirmed. Although not shown in the drawings, when the frequencies were swept sufficiently slowly (i.e., during slow sweeping), the comparative adaptive control could reduce the level of the error signal e(n) by 20 dB or more.

Figure 12:
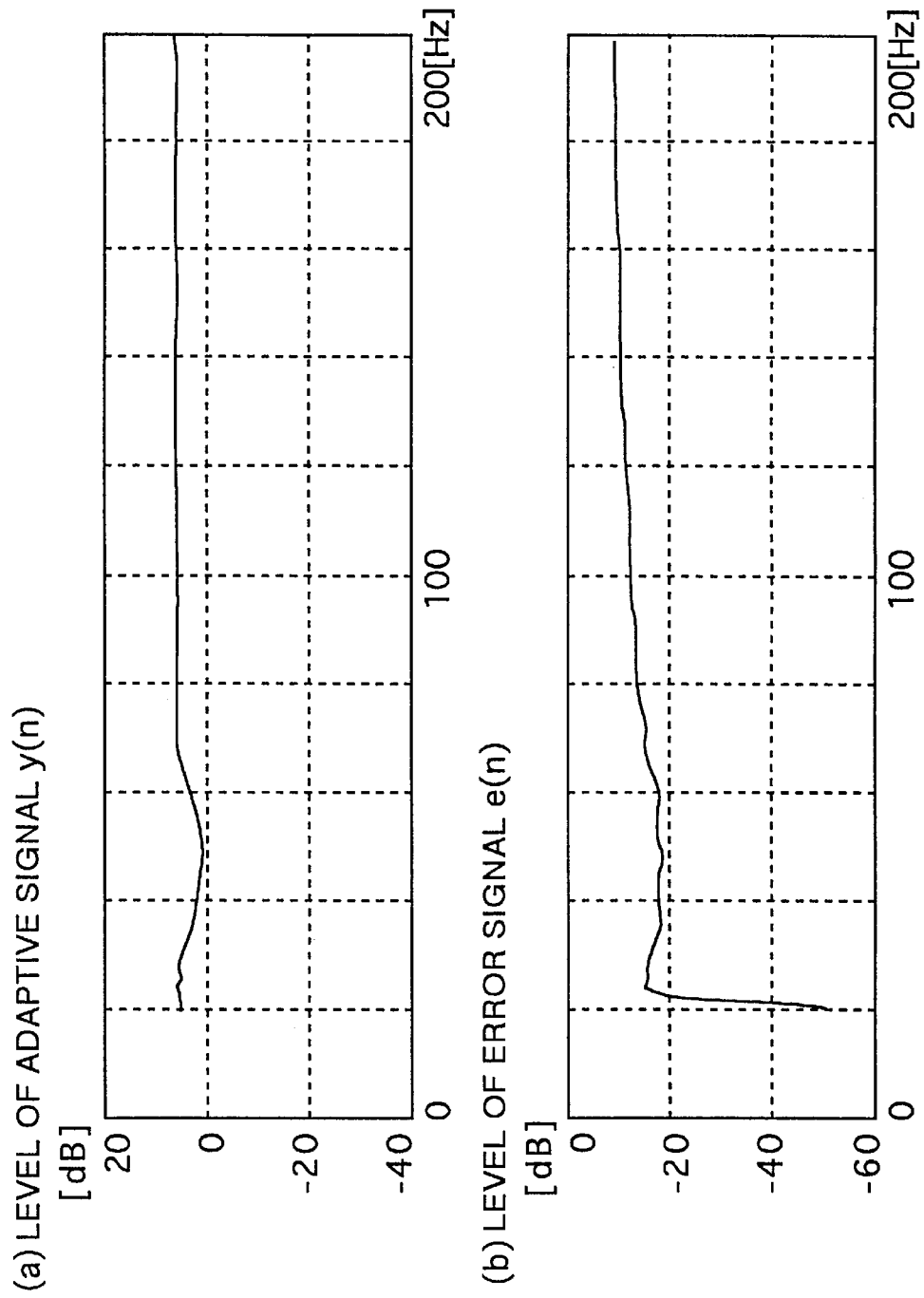

Finally, when Example No. 2 of the present cyclic-signal adaptive control method was carried out, the adaptive signal y(n) was generated, and the error e(n) was reduced to a significant level in the region where the frequency was less than 100 Hz as illustrated in FIGS. 12 (a) and 12 (b). More specifically, in the region where the frequency was less than 100 Hz, the error signal e(n) was reduced by several dB to ten dB more than the case where no control was carried out. Whilst, in the region where the frequency was more than 100 Hz, the control performance deteriorated gradually as the frequency approached 200 Hz, the level of the error signal increased slightly with respect to the case where no control was carried out. Note that, however, Example No. 2 reduced the level of the error signal by several dB with respect to that of the comparative adaptive control in all of the frequency sweeping regions. Thus, when the frequencies were swept rapidly, Example No. 2 of the present cyclic-signal adaptive control method can improve the reduction level of the error signal with respect to that of the comparative adaptive control.

Figure 13:
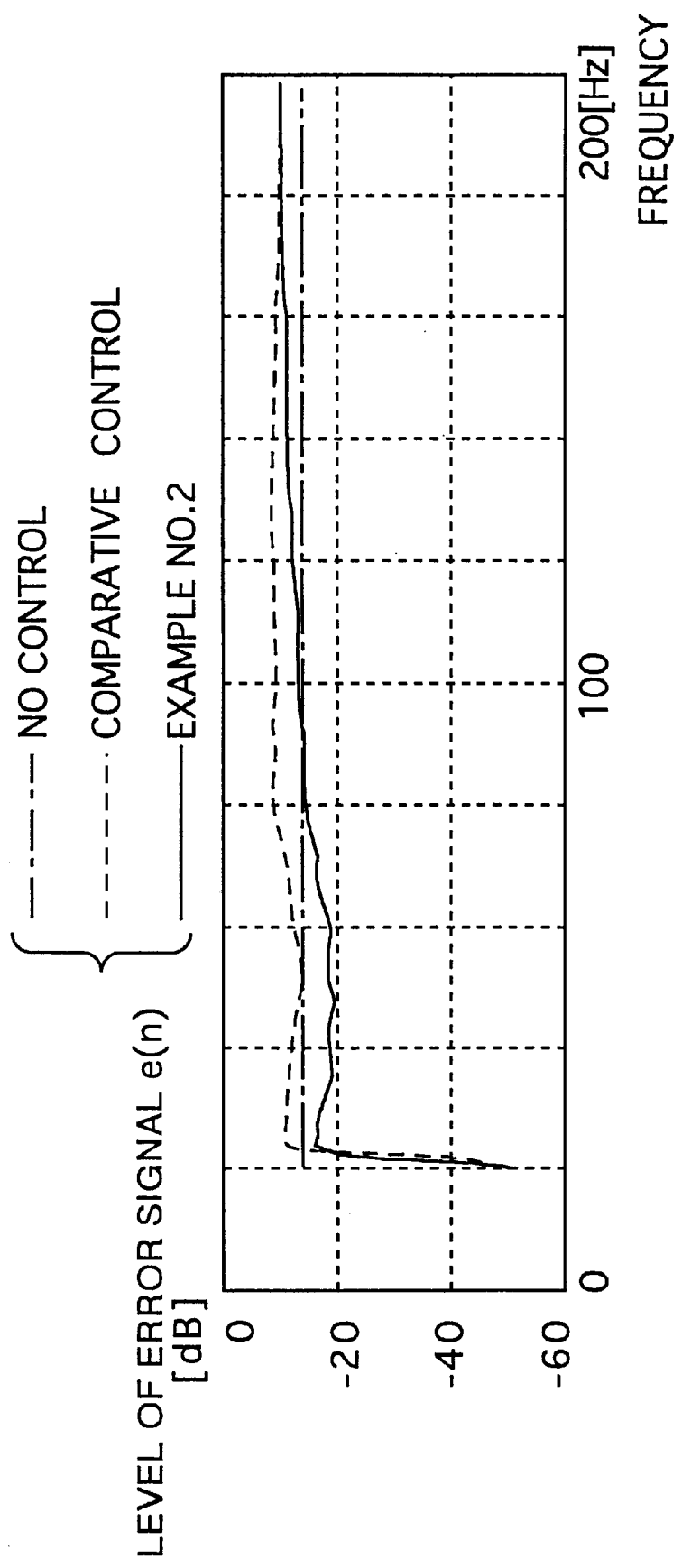
FIG. 13 is a graph for justifying the advantages of the adaptive control which were produced by Example No. 2.

To summarize the foregoing discussions, the levels of the error signals e(n) of all the cases, where no control was carried out, where the comparative adaptive control was carried out, and where Example No. 2 was carried out, are illustrated in FIG. 13 in a superimposed manner. As shown in the drawing, in almost all the region where the frequencies were swept rapidly, the error signal of Example No. 2 was reduced by several dB more than the error signal of the comparative adaptive control. It is apparent from the results of these tests that, while securing the convergence stability of the adaptive control, Example No. 2 could improve the adaptability against the rapid frequency sweeping more than the comparative adaptive control did.

Modified Version of Example No. 2

Figure 14:
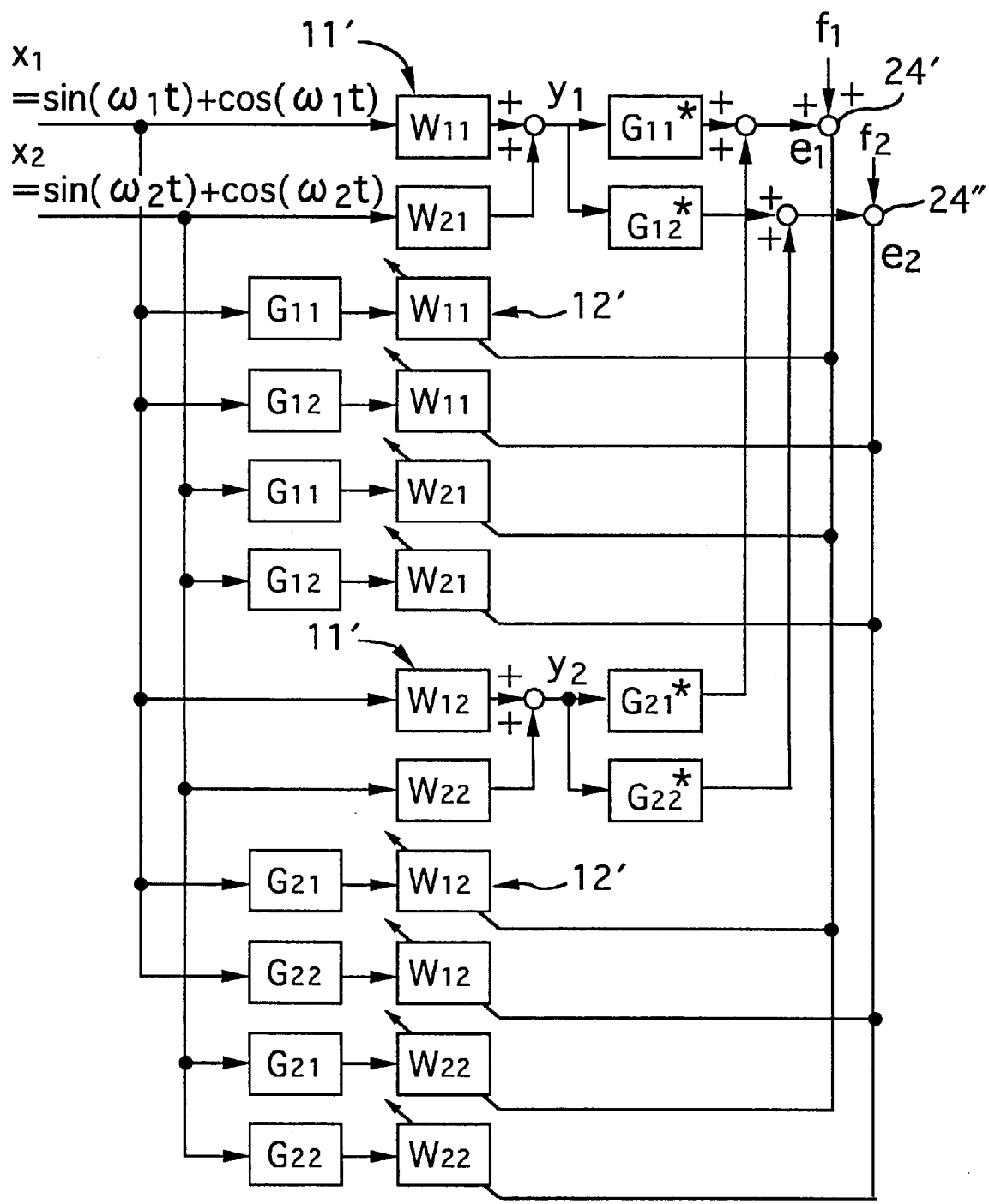
FIG. 14 is a system block diagram for illustrating a modified version of Example No. 2 of the present cyclic-signal adaptive control method.

A modified version of Example No. 2 is illustrated in FIG. 14. As shown in the drawing, the "(orthogonalized) quasi-normalized DXHS algorithm" can be carried out so that the present cyclic-signal adaptive control method is expanded to a multi-input/multi-output system in which a plurality of angular frequency components are suppressed In FIG. 14, the adaptive signal generation algorithm 11' is considered and illustrated as an adaptive filter. Note that, however, the adaptive signal generation algorithm 11' is the same as the adaptive signal generation algorithm 11' shown in FIG. 9 essentially. This modified version is the simplest version, and exemplifies a two-input/two-output system to which cyclic signals having two angular frequencies are input. The angular frequencies of the cyclic signals $f_1(n)$ and $f_2(n)$ to be suppressed are two angular frequencies $\omega_1$ and $\omega_2$. It is unnecessary that the two angular frequencies are a fundamental frequency and a harmonic component of the fundamental frequency with each other.

As set forth in Equation (11) below, the adaptive signal generation algorithm 11' of this modified version is an algorithm for generating two adaptive signals $y_m(n)$ (m=1 and 2). Whilst, as set forth in Equation (12) below, the adaptive coefficient vector renewing algorithm 12' is an algorithm for adaptively adjusting the amplitudes $\alpha_{km}(n)$ and $\beta_{km}(n)$ of the two adaptive signals $y_m(n)$ by the quasi-normalized algorithm.

$$y_m(n) = \sum_{k=1}^{K} [\alpha_{km}(n)\sin\{\omega_k Tn\} + \beta_{km}(n)\cos\{\omega_k Tn\}] \qquad \text{Equation (11)}$$

wherein K=2, and m=1 and 2.

$$W_{km}(n+1) = \begin{bmatrix} \alpha_{km}(n+1) \\ \beta_{km}(n+1) \end{bmatrix} = \begin{bmatrix} \alpha_{km}(n) \\ \beta_{km}(n) \end{bmatrix} - \begin{bmatrix} \sum_{l=1}^{L} \frac{\mu_{\alpha klm}}{[\gamma_{lm} + A_{lm}(\omega_k)]} e_l(n)\sin[\omega_k Tn + \Phi_{lm}(\omega_k)] \\ \sum_{l=1}^{L} \frac{\mu_{\beta klm}}{[\gamma_{lm} + A_{lm}(\omega_k)]} e_l(n)\cos[\omega_k Tn + \Phi_{lm}(\omega_k)] \end{bmatrix} \qquad \text{Equation (12)}$$

wherein k=1 and 2, L=2, and m=1 and 2.

Thus, even in the two-input/two-output system, this modified version can produce the advantages of the adaptive control in the same manner as Example No. 2 described above. By amplifying the modified version, it is easy to expand the modified version to an L-input/M-output system for K components ($1 \leq K$, L and M).

Having now fully described the present invention, it will be apparent to one of ordinary skill in the art that many changes and modifications can be made thereto without departing from the spirit or scope of the present invention as set forth herein including the appended claims.

What is claimed is:

1. An adaptive control method for a cyclic signal comprising the step of:
   adding an adaptive signal y(n) to a cyclic signal f(n) in an inverted phase at a measurement point by way of a transfer system having a predetermined transfer characteristic, thereby actively eliminating an influence of specific components of the cyclic signal f(n) to the measurement point, and suppressing an error signal e(n) detected at the measurement point to which the cyclic signal f(n) is input;
   the cyclic signal f(n) including at least one angular frequency $\omega_k^*$ ($1 \leq k \leq K'$, k and K' are natural numbers.);
   the adaptive signal y(n) being a linear combination of at least one sinusoidal signal whose angular frequencies $\omega_k$ ($1 \leq k \leq K \leq K'$, K is also a natural number.)

are K pieces of measurements or estimations of the angular frequencies $\omega_k^*$;

wherein the adaptive control method employing:
- an adaptive signal generation algorithm for generating the adaptive signal y(n) at each time n in a discrete time; and
- an adaptive coefficient vector renewing algorithm for carrying out a quasi-normalized gradient method;

the quasi-normalized gradient method comprising the step of:
- subtracting a vector from an adaptive coefficient vector W(n), thereby renewing the adaptive coefficient vector W(n);
- the adaptive coefficient vector W(n) including components defining at least amplitudes and phases of the sinusoidal components of the adaptive signal y(n);
- the vector being prepared by multiplying components of a gradient vector $\nabla(n) = \partial e^2(n)/\partial W(n)$ with appropriate step size parameters, and by dividing the resulting products with a sum $(A_k + \gamma_k)$;
  - $A_k$ being gain measurements or gain estimations of the transfer characteristic corresponding to the angular frequencies $\omega_k$;
  - $\gamma_k$ $(0 \leq \gamma_k)$ being appropriate divergence prevention constants;

whereby at least the amplitudes and phases of the sinusoidal components of the adaptive signal y(n) are replaced with components of the renewed adaptive coefficient vector W(n).

2. An adaptive control method for a cyclic signal according to claim 1, wherein:
- said adaptive signal generation algorithm is an algorithm for generating said adaptive signal y(n) according to Equation (1) below;
- said adaptive coefficient vector W(n) is a vector whose components are the amplitude $a_k(n)$ and phase $\phi_k(n)$ of the sinusoidal components of said adaptive signal y(n); and
- said adaptive coefficient vector renewing algorithm is an algorithm for renewing the adaptive coefficient vector W(n) according to Equation (2) below;
- whereby at least the amplitudes $a_k(n)$ and phases $\phi_k(n)$ of the sinusoidal components of said adaptive signal y(n) are replaced with renewed components of the adaptive coefficient vector W(n), the adaptive coefficient vector W(n) being renewed by said adaptive coefficient vector renewing algorithm;

$$y(n) = \sum_{k=1}^{K} a_k(n)\exp[j\{\omega_k Tn + \phi_k(n)\}] \quad \text{Equation (1)}$$

wherein
- j: Imaginary Unit; and T: Sampling Interval, $1 \leq k \leq K$; $\exp[j\theta] = \cos\theta$; and $j\exp[j\theta] = -\sin\theta$.

$$W(n+1) = \begin{bmatrix} \vdots \\ a_k(n+1) \\ \vdots \\ \phi_k(n+1) \\ \vdots \end{bmatrix} = \begin{bmatrix} \vdots \\ a_k(n) \\ \vdots \\ \phi_k(n) \\ \vdots \end{bmatrix} - \begin{bmatrix} \vdots \\ \frac{\mu_a}{[\gamma + A(\omega_k)]} e(n) \cdot \exp[j\{\omega_k Tn + \phi_k(n) + \Phi(\omega_k)\}] \\ \vdots \\ \frac{\mu_\phi}{[\gamma + A(\omega_k)]} e(n) j\exp[j\{\omega_k Tn + \phi_k(n) + \Phi(\omega_k)\}] \\ \vdots \end{bmatrix} \quad \text{Equation (2)}$$

wherein
- $\gamma$: Divergence Prevention Constant;
- $A(\omega_k)$: Gain Measurements of Transfer Characteristic at Angular Frequencies $\omega_k$; and
- $\Phi(\omega_k)$: Measurements of Phase Characteristic of Transfer Characteristic at Angular Frequencies $\omega_k$.

3. An adaptive control method for a cyclic signal according to claim 1, wherein:
- said adaptive signal generation algorithm is an algorithm for generating said adaptive signal y(n) according to Equation (3) below;
- said adaptive coefficient vector W(n) is a vector whose components are both of the amplitudes $\alpha_k(n)$ and $\beta_k(n)$ of vibration components of said adaptive signal y(n); and
- said adaptive coefficient vector renewing algorithm is an algorithm for renewing the adaptive coefficient vector W(n) according to Equation (4) below;
- whereby at least both of the amplitudes $\alpha_k(n)$ and $\beta_k(n)$ of the vibration components of said adaptive signal y(n) are replaced with renewed components of the adaptive coefficient vector W(n), the adaptive coefficient vector W(n) being renewed by said adaptive coefficient vector renewing algorithm;

$$y(n) = \sum_{k=1}^{K} [\alpha_k(n)\sin\{\omega_k Tn\} + \beta_k(n)\cos\{\omega_k Tn\}] \quad \text{Equation (3)}$$

wherein
T: Sampling Interval, $1 \leq k \leq K$.

$$W(n+1) = \begin{bmatrix} \vdots \\ \alpha_k(n+1) \\ \vdots \\ \beta_k(n+1) \\ \vdots \end{bmatrix} = \begin{bmatrix} \vdots \\ \alpha_k(n) \\ \vdots \\ \beta_k(n) \\ \vdots \end{bmatrix} - \begin{bmatrix} \vdots \\ \frac{\mu_\alpha}{[\gamma + A(\omega_k)]} e(n)\sin[\omega_k Tn + \Phi(\omega_k)] \\ \vdots \\ \frac{\mu_\beta}{[\gamma + A(\omega_k)]} e(n)\cos[\omega_k Tn + \Phi(\omega_k)] \\ \vdots \end{bmatrix} \quad \text{Equation (4)}$$

wherein
- $\gamma$: Divergence Prevention Constant;
- $A(\omega_k)$: Gain Measurements of Transfer Characteristic at Angular Frequencies $\omega_k$; and
- $\Phi(\omega_k)$: Measurements of Phase Characteristic of Transfer Characteristic at Angular Frequencies $\omega_k$.

* * * * *